(12) United States Patent
Griffin et al.

(10) Patent No.: US 8,259,074 B2
(45) Date of Patent: Sep. 4, 2012

(54) KEY ARRANGEMENT FOR A KEYBOARD

(75) Inventors: Jason T. Griffin, Waterloo (CA); Frank M. Tyneski, Kitchener (CA)

(73) Assignee: Research In Motion Limited, Waterloo (CA)

( * ) Notice: Subject to any disclaimer, the term of this patent is extended or adjusted under 35 U.S.C. 154(b) by 695 days.

(21) Appl. No.: 12/201,992

(22) Filed: Aug. 29, 2008

(65) Prior Publication Data

US 2008/0316179 A1  Dec. 25, 2008

Related U.S. Application Data

(63) Continuation of application No. 10/902,975, filed on Jul. 30, 2004, now Pat. No. 7,439,959.

(51) Int. Cl.
*G06F 3/02* (2006.01)
*B41J 5/12* (2006.01)

(52) U.S. Cl. ......... 345/169; 345/168; 400/472; 400/488

(58) Field of Classification Search ............... 400/472, 400/486, 488, 489; 345/168, 169
See application file for complete search history.

(56) References Cited

U.S. PATENT DOCUMENTS

| | | | |
|---|---|---|---|
| 606,903 A | 7/1898 | Torrey | |
| 1,030,002 A | 6/1912 | Schmitt | |
| 1,319,687 A | 10/1919 | Bates | |
| 3,293,362 A | 12/1966 | Veldkamp | |
| 3,633,724 A | 1/1972 | Samuel | |
| D228,137 S | 8/1973 | Chadima, Jr. | |
| D237,622 S | 11/1975 | Oyama | |
| 3,967,273 A | 6/1976 | Knowlton | |
| 4,029,915 A | 6/1977 | Ojima | |
| D249,345 S | 9/1978 | Oliveira et al. | |
| D258,956 S | 4/1981 | Chadima, Jr. | |
| D266,855 S | 11/1982 | Yoshioka et al. | |
| 4,449,839 A | 5/1984 | Bleuer | |
| D278,059 S | 3/1985 | Desrochers | |
| D278,341 S | 4/1985 | Scheid | |
| D291,201 S | 8/1987 | Weisel et al. | |
| D293,241 S | 12/1987 | Wan et al. | |
| D298,546 S | 11/1988 | Yoshioka et al. | |
| D298,622 S | 11/1988 | Yubisui et al. | |

(Continued)

FOREIGN PATENT DOCUMENTS

EP 0129996 1/1985

(Continued)

OTHER PUBLICATIONS

Office Action mailed Jan. 19, 2010 for CA 2,575,435.

(Continued)

*Primary Examiner* — My-Chau T Tran
(74) *Attorney, Agent, or Firm* — Novak Druce + Quigg LLP (57) ABSTRACT

A key arrangement includes a plurality of keys that are arranged in a regular grid of rows and columns. The columns include a first column, a last column, and at least one middle column. The keys in the first and last columns are smaller than the keys in the at least one middle column. A method for improving the ergonomics of a key arrangement on a keyboard of a fixed size is provided. A method for designing a key arrangement for a mobile communication device is also provided.

22 Claims, 9 Drawing Sheets

U.S. PATENT DOCUMENTS

| | | |
|---|---|---|
| D299,251 S | 1/1989 | Endo et al. |
| D303,112 S | 8/1989 | Desrochers |
| D303,981 S | 10/1989 | Takemata et al. |
| D304,175 S | 10/1989 | Sakaguchi et al. |
| D304,718 S | 11/1989 | Sakaguchi et al. |
| D307,888 S | 5/1990 | Ishida |
| D307,890 S | 5/1990 | Kim |
| D309,729 S | 8/1990 | Tanabe |
| D312,628 S | 12/1990 | Yokoi et al. |
| D313,224 S | 12/1990 | Yokoi et al. |
| D313,401 S | 1/1991 | Tanabe |
| D313,413 S | 1/1991 | Langton |
| D319,433 S | 8/1991 | Pearce |
| 5,059,048 A | 10/1991 | Sirkin |
| D330,543 S | 10/1992 | Tsuchida et al. |
| D332,604 S | 1/1993 | Miyake et al. |
| 5,184,830 A | 2/1993 | Okada et al. |
| 5,217,295 A | 6/1993 | Tortola et al. |
| D341,825 S | 11/1993 | Hamilton |
| 5,288,158 A | 2/1994 | Matias |
| D348,654 S | 7/1994 | Branck et al. |
| 5,336,001 A | 8/1994 | Lichtenberg |
| 5,336,002 A | 8/1994 | Russo |
| 5,337,346 A | 8/1994 | Uchikura |
| 5,360,280 A | 11/1994 | Camacho et al. |
| 5,367,298 A | 11/1994 | Axthelm |
| D357,253 S | 4/1995 | Wong |
| 5,410,141 A | 4/1995 | Koenck et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,457,454 A | 10/1995 | Sugano |
| D367,043 S | 2/1996 | Ross et al. |
| 5,497,151 A | 3/1996 | Dombroski |
| 5,500,643 A | 3/1996 | Grant |
| D368,708 S | 4/1996 | Maynard et al. |
| 5,543,787 A | 8/1996 | Karidis et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| D381,021 S | 7/1997 | Williams et al. |
| D381,638 S | 7/1997 | Kruse et al. |
| 5,659,307 A | 8/1997 | Karidis et al. |
| 5,661,605 A | 8/1997 | Conway |
| D383,756 S | 9/1997 | Henderson et al. |
| 5,664,896 A | 9/1997 | Blumberg |
| 5,672,108 A | 9/1997 | Lam et al. |
| D385,855 S | 11/1997 | Ronzani |
| D386,497 S | 11/1997 | Huslig et al. |
| 5,689,253 A | 11/1997 | Hargreaves et al. |
| 5,700,097 A | 12/1997 | Kuhlenschmidt |
| D389,139 S | 1/1998 | Oross et al. |
| D390,509 S | 2/1998 | Antzinas et al. |
| 5,737,394 A | 4/1998 | Anderson et al. |
| D396,215 S | 7/1998 | Inukai |
| 5,786,776 A | 7/1998 | Kisaichi et al. |
| D397,369 S | 8/1998 | Rissman |
| 5,790,103 A | 8/1998 | Willner |
| D397,679 S | 9/1998 | Hawkins et al. |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| 5,827,082 A | 10/1998 | Laine |
| 5,841,374 A | 11/1998 | Abraham |
| D402,572 S | 12/1998 | Han |
| D403,362 S | 12/1998 | Fai |
| D403,667 S | 1/1999 | Musha |
| 5,861,821 A | 1/1999 | Kato et al. |
| D406,839 S | 3/1999 | Forget |
| 5,893,798 A | 4/1999 | Stambolic et al. |
| D409,185 S | 5/1999 | Kawashima |
| D409,601 S | 5/1999 | Wicks et al. |
| D411,528 S | 6/1999 | Tien |
| 5,915,228 A | 6/1999 | Kunihiro et al. |
| 5,920,308 A | 7/1999 | Kim |
| 5,931,873 A | 8/1999 | Cisar |
| 5,936,614 A | 8/1999 | An et al. |
| 5,953,541 A | 9/1999 | King et al. |
| 5,963,197 A | 10/1999 | Bacon et al. |
| 5,974,238 A | 10/1999 | Chase, Jr. |
| D416,253 S | 11/1999 | Hibino |
| D416,256 S | 11/1999 | Griffin et al. |
| 5,982,520 A | 11/1999 | Weiser et al. |
| 5,995,026 A | 11/1999 | Sellers |
| 6,005,496 A | 12/1999 | Hargreaves et al. |
| 6,006,351 A | 12/1999 | Peretz et al. |
| 6,009,333 A | 12/1999 | Chaco |
| 6,011,554 A | 1/2000 | King et al. |
| 6,014,429 A | 1/2000 | LaPorta et al. |
| 6,014,573 A | 1/2000 | Lehtonen et al. |
| D420,351 S | 2/2000 | Waldner |
| 6,023,779 A | 2/2000 | Fullam et al. |
| 6,047,047 A | 4/2000 | Aldridge et al. |
| 6,047,196 A | 4/2000 | Makela et al. |
| 6,049,796 A | 4/2000 | Siitonen et al. |
| 6,052,070 A | 4/2000 | Kivela et al. |
| D425,887 S | 5/2000 | Edwards |
| 6,084,576 A | 7/2000 | Leu et al. |
| 6,091,956 A | 7/2000 | Hollenberg |
| 6,094,197 A | 7/2000 | Buxton et al. |
| D429,226 S | 8/2000 | Siddoway et al. |
| 6,102,594 A | 8/2000 | Strom |
| 6,103,979 A | 8/2000 | Motoyama et al. |
| 6,107,997 A | 8/2000 | Ure |
| D432,511 S | 10/2000 | Eckholm |
| D433,017 S | 10/2000 | Martinez |
| D433,460 S | 11/2000 | Griffin et al. |
| D434,034 S | 11/2000 | Burke et al. |
| 6,148,261 A | 11/2000 | Obradovich et al. |
| D434,739 S | 12/2000 | Hanna et al. |
| 6,157,323 A | 12/2000 | Tso et al. |
| D435,844 S | 1/2001 | Yeh |
| D436,591 S | 1/2001 | Abston et al. |
| D439,898 S | 4/2001 | Ober et al. |
| D440,562 S | 4/2001 | Gottlieb et al. |
| 6,212,412 B1 | 4/2001 | Rogers et al. |
| D441,733 S | 5/2001 | Do et al. |
| D442,156 S | 5/2001 | Lee |
| D442,173 S | 5/2001 | Wang et al. |
| D442,569 S | 5/2001 | Hanna et al. |
| D443,612 S | 6/2001 | Evers et al. |
| 6,243,789 B1 | 6/2001 | Hasbun et al. |
| D445,106 S | 7/2001 | Mosgrove et al. |
| D446,526 S | 8/2001 | Evers et al. |
| 6,278,772 B1 | 8/2001 | Griffin et al. |
| 6,286,064 B1 | 9/2001 | King et al. |
| 6,295,052 B1 | 9/2001 | Kato et al. |
| D448,765 S | 10/2001 | Cohen et al. |
| D449,595 S | 10/2001 | Park et al. |
| D449,596 S | 10/2001 | Park et al. |
| D449,830 S | 10/2001 | Vuolteeenaho et al. |
| 6,297,795 B1 | 10/2001 | Kato et al. |
| 6,304,261 B1 | 10/2001 | Shields et al. |
| 6,304,431 B1 | 10/2001 | Kim |
| 6,307,548 B1 | 10/2001 | Flinchem et al. |
| 6,307,549 B1 | 10/2001 | King et al. |
| 6,310,609 B1 | 10/2001 | Morgenthaler |
| D451,079 S | 11/2001 | Ali |
| D451,092 S | 11/2001 | Park et al. |
| D451,502 S | 12/2001 | Vuolteeenaho et al. |
| 6,333,734 B1 | 12/2001 | Rein |
| D452,687 S | 1/2002 | Yeh |
| D453,149 S | 1/2002 | Skoger et al. |
| D453,158 S | 1/2002 | Chen |
| D453,332 S | 2/2002 | Herath |
| D454,348 S | 3/2002 | Yeh |
| D454,349 S | 3/2002 | Makidera et al. |
| D454,849 S | 3/2002 | Eckholm |
| 6,356,258 B1 | 3/2002 | Kato et al. |
| 6,374,277 B2 | 4/2002 | Vong et al. |
| 6,378,234 B1 | 4/2002 | Luo |
| D456,794 S | 5/2002 | Laverick et al. |
| D456,804 S | 5/2002 | Fisher et al. |

| | | | | | | |
|---|---|---|---|---|---|---|
| D456,805 S | 5/2002 | Ono et al. | | D497,160 S | 10/2004 | Nagao et al. |
| D456,806 S | 5/2002 | Ahearn et al. | | 6,809,660 B2 | 10/2004 | Bestle |
| 6,385,463 B1 | 5/2002 | Lieberman et al. | | 7,199,786 B2 * | 4/2007 | Suraqui .................. 345/168 |
| 6,396,482 B1 | 5/2002 | Griffin et al. | | 2001/0006587 A1 | 7/2001 | Keinonen |
| D458,239 S | 6/2002 | Shim et al. | | 2001/0044828 A1 | 11/2001 | Kikinis |
| D459,327 S | 6/2002 | Ali | | 2001/0048378 A1 | 12/2001 | Horie |
| D460,068 S | 7/2002 | Lanzaro et al. | | 2002/0027549 A1 | 3/2002 | Hirshberg |
| D460,493 S | 7/2002 | Griffin et al. | | 2002/0030965 A1 | 3/2002 | Katz |
| D461,803 S | 8/2002 | Griffin et al. | | 2002/0149566 A1 | 10/2002 | Sarkissian |
| D462,357 S | 9/2002 | Jenkins | | 2002/0180708 A1 * | 12/2002 | Kaelbling .................. 345/169 |
| D463,421 S | 9/2002 | Lanzaro et al. | | 2003/0006968 A1 | 1/2003 | Solomon |
| D463,425 S | 9/2002 | Jenkins | | 2003/0030624 A1 | 2/2003 | Aoyama |
| 6,452,588 B2 | 9/2002 | Griffin et al. | | 2003/0067445 A1 | 4/2003 | Hirshberg et al. |
| D464,962 S | 10/2002 | MacGregor et al. | | 2003/0073456 A1 | 4/2003 | Griffin et al. |
| D464,963 S | 10/2002 | Nishida | | 2003/0087609 A1 | 5/2003 | Cheng |
| D464,995 S | 10/2002 | Griffin et al. | | 2003/0107555 A1 | 6/2003 | Williams |
| 6,459,968 B1 | 10/2002 | Kochie | | 2003/0160712 A1 | 8/2003 | Levy |
| D465,219 S | 11/2002 | Tamaki et al. | | 2003/0193478 A1 | 10/2003 | Ng et al. |
| D466,116 S | 11/2002 | Bhatia et al. | | 2004/0069600 A1 | 4/2004 | Xie |
| D466,877 S | 12/2002 | Hawkins et al. | | 2004/0108994 A1 | 6/2004 | Kato |
| D467,235 S | 12/2002 | Hawkins et al. | | 2004/0121816 A1 | 6/2004 | Yang |
| D467,918 S | 12/2002 | Fitch et al. | | 2004/0189607 A1 | 9/2004 | Afanasiev |
| 6,489,950 B1 | 12/2002 | Griffin et al. | | 2004/0198249 A1 | 10/2004 | Grifffin |
| D468,307 S | 1/2003 | Chuang | | 2005/0052419 A1 | 3/2005 | Burroughs |
| D468,714 S | 1/2003 | Maruska et al. | | 2006/0214916 A1 | 9/2006 | Mulford |
| D469,367 S | 1/2003 | Mirabelli et al. | | | | |
| 6,507,336 B1 | 1/2003 | Lunsford | | | FOREIGN PATENT DOCUMENTS | |
| D469,749 S | 2/2003 | Kim | | EP | 0267801 | 5/1988 |
| D470,137 S | 2/2003 | Everett et al. | | EP | 0278169 | 8/1988 |
| D470,150 S | 2/2003 | Lewis, Jr. et al. | | EP | 0538020 | 4/1993 |
| D470,842 S | 2/2003 | Bhatia et al. | | EP | 0685801 | 12/1995 |
| D470,843 S | 2/2003 | Horiki | | EP | 0732646 | 9/1996 |
| D471,904 S | 3/2003 | Majanen | | EP | 0760291 | 3/1997 |
| D472,225 S | 3/2003 | Griffin | | EP | 0882259 | 12/1998 |
| 6,535,749 B1 | 3/2003 | Iwata et al. | | EP | 0540147 | 6/1999 |
| 6,538,651 B1 | 3/2003 | Haymann et al. | | EP | 1143327 | 10/2001 |
| D472,551 S | 4/2003 | Griffin | | GB | 2242047 | 9/1991 |
| D473,226 S | 4/2003 | Griffin | | JP | 2002251253 | 6/2002 |
| D476,317 S | 6/2003 | Lehtonen | | JP | 2002222037 | 8/2002 |
| D476,320 S | 6/2003 | Arbisi | | JP | 2003258977 | 9/2003 |
| D476,330 S | 6/2003 | Ahearn et al. | | JP | 2004513415 | 4/2004 |
| D476,647 S | 7/2003 | Lehtonen | | JP | 2004517562 | 6/2004 |
| D476,983 S | 7/2003 | Salmi | | WO | 9833111 | 7/1998 |
| D476,984 S | 7/2003 | Salmi | | WO | 9844631 | 10/1998 |
| D476,985 S | 7/2003 | Griffin | | WO | 9937025 | 7/1999 |
| D477,956 S | 7/2003 | Hayes | | WO | 0030381 | 5/2000 |
| 6,597,345 B2 | 7/2003 | Hirshberg | | WO | 0038041 | 6/2000 |
| D478,585 S | 8/2003 | Griffin | | WO | 0074240 | 12/2000 |
| 6,611,254 B1 | 8/2003 | Griffin et al. | | WO | 0150335 | 7/2001 |
| D479,232 S | 9/2003 | Bruno et al. | | WO | 0185460 | 11/2001 |
| D479,233 S | 9/2003 | Griffin | | WO | 0195358 | 12/2001 |
| D480,697 S | 10/2003 | Lee et al. | | WO | 02054737 | 7/2002 |
| D480,722 S | 10/2003 | Griffin | | WO | 02088920 | 11/2002 |
| 6,630,924 B1 | 10/2003 | Peck | | WO | 02101531 A1 | 12/2002 |
| 6,647,367 B2 | 11/2003 | McArthur et al. | | WO | 03012617 | 2/2003 |
| D484,873 S | 1/2004 | Salmi | | WO | 03019519 | 3/2003 |
| 6,703,963 B2 | 3/2004 | Higginson | | WO | 03041047 | 5/2003 |
| D489,368 S | 5/2004 | Yoneda et al. | | WO | 03056784 | 7/2003 |
| D489,717 S | 5/2004 | Hsieh | | WO | 03100804 | 12/2003 |
| D490,421 S | 5/2004 | Everett et al. | | WO | 2005064444 | 7/2005 |
| D490,422 S | 5/2004 | Iwama et al. | | WO | 2006/010272 | 2/2006 |
| D491,172 S | 6/2004 | Sheu | | | | |
| D491,929 S | 6/2004 | Nuovo et al. | | | OTHER PUBLICATIONS | |

Office Action mailed Feb. 1, 2008 for U.S. Appl. No. 10/902,975.
Programmable Calculators: Hewlett-Packard HP-200LX, Viktor T. Toth, copyr. 2001,2002, from web page at www.rskey.org/hp2001x.htm.
Anonymous: Trangular Toggle Keys for Touch Phones; IBM Technical Disclosure Bulletin, vol. 31 No. 1, Jun. 1, 1998, pp. 47-49, New York, US.
IBM Technical Disclosure Bulletin; vol. 18, No. 12; May 1976; pp. 4187-4190.
Phone key pads, from web page www.dialabc.com/motion/keypads.html. printed Jan. 21, 2004.
Commercial Telecommunication Standards E- series ITU-T Recommendations, from web page http://wwwcomm.itsa.disa.mil/itu/r_e0.html; printed Jan. 21, 2004.

Using Numeric Keypad with 4-way keys as New Standard for text entry in compact/mobile devices, David Hirschberg; 3 pages; submitted to a demonstration session in CHI 2003 conference.

Smart Virtual keyboard system suitable for mouse or stylus entry, Ruediger W. Knodt, Xerox Disclosure Journal 18 (1993) May/Jun., No. 3, Stamford, Conn, pp. 245-246.

Iconic Text Entry Using a Numeric Keypad, by John Jannotti, from web page www.pdos.lcs.mit.edu/-jj/jannotti.com/papers/iconic-uist02/; printed on Jan. 22, 2004.

Palm Tungsten C, rough guide to pocket stuff, Oct. 3, p. 45 (2pgs).

Palm Tungsten, W. Stuff Magazine, Dec. 3, p. 140.

Handspring Treo 600, Stuff Magazine, Dec. 3, p. 136.

Handspring Treo 90, Rough Guide to Pocket stuff, Oct. 3, p. 46 (2pgs).

Handspring Treo 270, Rough Guide to pocket stuff, Oct. 3, p. 39 (2pgs).

Sony Clie PEG-UX50, Stuff magazine, Jan. 4 p. 74 (2pgs).

Sony Clie NX 70 V, Rough Guide to pocket stuff, Oct. 3, p. 45.

Sony Ericsson p800, Stuff magazine, Dec. 3, p. 65 (2 pgs).

Sony Ericsson p900, Stuff magazine, Jan. 4, p. 12.

Orange E100, Rough Guide to pocket stuff, Oct. 3, p. 41 (2pgs).

Stuff magazine, Jan. 4, p. 113.

Nokia 7600, Stuff Magazine, Jan. 4, p. 24 (2 pgs).

Nokia N-gage, Stuff magazine, Dec. 3, p. 65

Nokia 3650, Stuff magazine, Dec. 3, p. 141 (2pgs).

Siemens SX1, Stuff magazine, Jan. 4, p. 64 (2pg).

TelMe T919, Rough Guide to Pocket Stuff, Oct. 3, p. 39.

Motorola A920, Stuff Magazine, Dec. 3, p. 137.

Sony Ericcson p900, Stuff Magazine, Jan. 4, p. 78 (2pgs).

Sony Clie NZ90, rough guide to pocket stuff, Oct. 3, p. 47 (2 pgs).

Motorola A920, Stuff Magazine, Dec. 3, p. 75 (2pgs).

Office Action mailed Jul. 2, 2008. In corresponding Japanese application No. 2007522889.

Office Action mailed May 24, 2011. In corresponding Japanese application No. 2009083685.

Office Action (Translation) mailed Aug. 9, 2010. In corresponding application No. 1020077005021.

Office Action (Translation) mailed Sep. 30, 2011. In corresponding application No. 1020077005021.

Examination Report mailed Feb. 28, 2008. In corresponding application No. 07038961.

Office Action (Translation) mailed Nov. 2, 2011. In corresponding application No. 2009083685.

Office Action (Translation) mailed Feb. 21, 2011. In corresponding application No. 1020077005021.

International Preliminary Report on Patentability mailed Dec. 8, 2008. In corresponding application No. PCT/CA2005/001191.

International Search report and Written Opinion mailed Nov. 16, 2005. In corresponding application No. PCT/CA2005/001191.

Written Opinion of the International Preliminary Examining Authority mailed Jul. 20, 2006. In corresponding application No. PCT/CA2005/001191.

Notice of Allowance and Fee(s) Due mailed Jul. 12, 2010. In corresponding Japanese patent application No. 2007-522889.

Notice of Allowance and Fee(s) Due mailed Oct. 19, 2010. In corresponding Canadian patent application No. 2,575,435.

Office Action mailed on Feb. 9, 2009. In corresponding Canadian patent application No. 2,575,435.

Examination report mailed Sep. 21, 2007. In corresponding United Kingdom patent application No. GB0703896.1.

Examination report mailed May 14, 2008. In corresponding United Kingdom patent application No. GB0703896.1.

Office Action mailed Aug. 9, 2010. In corresponding Korean patent application No. 10-2007-7005021. English translation included.

Final office Action mailed Feb. 2, 2009. In corresponding Japanese patent application No. 2007-522889.

Final Office Action mailed Sep. 30, 2011. In corresponding Korean patent application No. 10-2007-7005021. English translation included.

* cited by examiner

KEY ARRANGEMENT FOR A KEYBOARD

CROSS-REFERENCE TO RELATED APPLICATIONS

The present application is a continuation of U.S. application Ser. No. 10/902,975 filed Jul. 30, 2004, issued as U.S. Pat. No. 7,439,959 on Oct. 21, 2008. Said application is expressly incorporated herein by reference in its entirety.

FIELD

This technology relates to a key arrangement for a keyboard of an electronic device. In particular, the technology concerns a key arrangement for a handheld mobile communication device.

BACKGROUND

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, so has the size of the keyboards and the keys on the keyboard. As the size of the keys has decreased, it has become harder for a user to accurately select the desired keys, since large fingers have a tendency to depress more than one key at a time. Care must be taken to select the proper key when small keyboards are utilized.

In addition to smaller devices, larger keyboards have also become more popular. As the frequency of text messaging and wireless email transmission has increased, text-entry keyboards have become a necessity. As a result, many manufacturers are utilizing full alphabetic keyboards on their devices in arrangements that are familiar to users. Different standard alphabetic keyboard arrangements are known. The most widely used English-language alphabetic key arrangement is the QWERTY arrangement. Other types of standard English-language alphabetic key arrangements include QWERTZ, AZERTY and DVORAK, among other known arrangements. Mobile communication devices also utilize numbers for placing telephone calls. Numbers can be arranged on keyboards as a standard telephone keypad arrangement, or as a standard numeric keypad arrangement. The numeric keys may share keys with alphabetic characters, or may be positioned on separate keys. Alternatively, numbers can share or be arranged above the top row of letters, such as in a conventional typewriter keyboard. In addition to full size alphabetic keyboards, reduced size keyboards are also utilized, where the keyboard utilizes fewer rows or columns than the standard alphabetic arrangement. A known reduced size keyboard is present on a telephone, where the letters are arranged in alphabetic order.

When selecting keys on a mobile communication device keyboard, it is often easier for a user to properly depress keys around the periphery of the keyboard than it is to depress keys in the interior of the key arrangement. Keys on the periphery of the keyboard typically are not situated next to other keys, and a user's finger will typically span the selected key and a portion of the housing of the device. In contrast, in the interior of the keyboard, a user's finger is more likely to span more than one key and may occasionally improperly depress a key. This is a nuisance for a user, who must then correct this error.

SUMMARY

In accordance with the teachings described herein, a key arrangement comprises a plurality of keys arranged in a regular grid of rows and columns. The columns comprise a first column, at least one middle column, and a last column. The keys in the first and last columns are smaller than the keys in the at least one middle column.

The plurality of keys may have a width and a height, and the width of the keys in the first and last columns is smaller than the width of the keys in the at least one middle column. Alternatively, the plurality of keys may have at least a first dimension and a second dimension, and the first dimension of the keys in the first and last columns is smaller than the first dimension of the keys in the at least one middle column.

The keys have a shape and the shape is one of regular or irregular. Each of the plurality of keys may have the same shape, with the keys in the first and last columns being a smaller version of the same shape. The plurality of keys may comprise keys having at least a first shape, a second shape and a third shape.

In another embodiment, a mobile communication device comprises a housing, a keyboard comprising the key arrangement discussed above coupled to the housing, and a display coupled to the housing. The housing may have a face with a top side, a bottom side, a left side, and a right side, and the first column is positioned adjacent the left side and the last column is positioned adjacent the right side.

In an alternative embodiment, a key arrangement comprises a first set of keys having at least one first size arranged in a pattern that has a plurality of sides, and a second set of keys positioned around at least two of the sides of the pattern. The second set of keys has a second size that is smaller than the at least one first size. The at least two sides may comprise part of the periphery of the pattern.

The first size may comprise a first width and the second size may comprise a second width, with the first width being greater than the second width. In another embodiment, the first size comprises a first height and a first width and the second size comprises a second height and a second width, with the first height being greater than the second height and the first width being greater than the second width. The pattern may comprise a plurality of rows and a plurality of columns, with keys in the outermost columns of the pattern being the second set of keys.

In another embodiment, a device comprises a housing having a face with a top, a bottom, a left side, and a right side. A display and a keyboard are coupled to the face of the housing. The keyboard comprises a plurality of keys arranged in a pattern that has a plurality of rows and a plurality of columns, with the plurality of columns including a first column, a last column, and at least one middle column. The keys in the first column are positioned adjacent the left side of the housing and the keys in the last column are positioned adjacent the right side of the housing. The keys in the first and last columns have a size that is smaller than the size of the keys in the at least one middle column.

In yet another embodiment, a method for improving the ergonomics of a key arrangement on a keyboard of a fixed size comprises providing a plurality of keys arranged in a plurality of columns and a plurality of rows, with the plurality of columns comprising a first column, a last column, and at least one middle column. The method also includes defining the key size for the keys in the at least one middle column to have at least one first size and defining the key size for the keys in the first and last columns to have a second size that is smaller than the corresponding at least one first size. The first size is at least one of a width and a height.

In a further embodiment, a method for designing a key arrangement for a mobile communication device is provided. The key arrangement includes a plurality of keys arranged in a grid pattern that includes a plurality of columns. The plurality of columns includes a plurality of middle columns that are flanked by outer columns. The method comprises measuring a width of a face of a mobile communication device, dividing the width of the face by a number corresponding to the number of columns of keys to determine a preliminary key width, and subtracting an amount from the preliminary key width to determine an outer column key width, with the amount corresponding to a decrease in width for keys in the outer columns of the grid pattern of keys. The method further includes multiplying the preliminary key width by the number of middle columns to determine a preliminary total middle key width, adding the preliminary total middle key width to the amount multiplied by two to determine a final total middle key width, and dividing the final total middle key width by the number of middle columns to determine a final key width for the keys in the middle columns.

DETAILED DESCRIPTION

Figure 1:
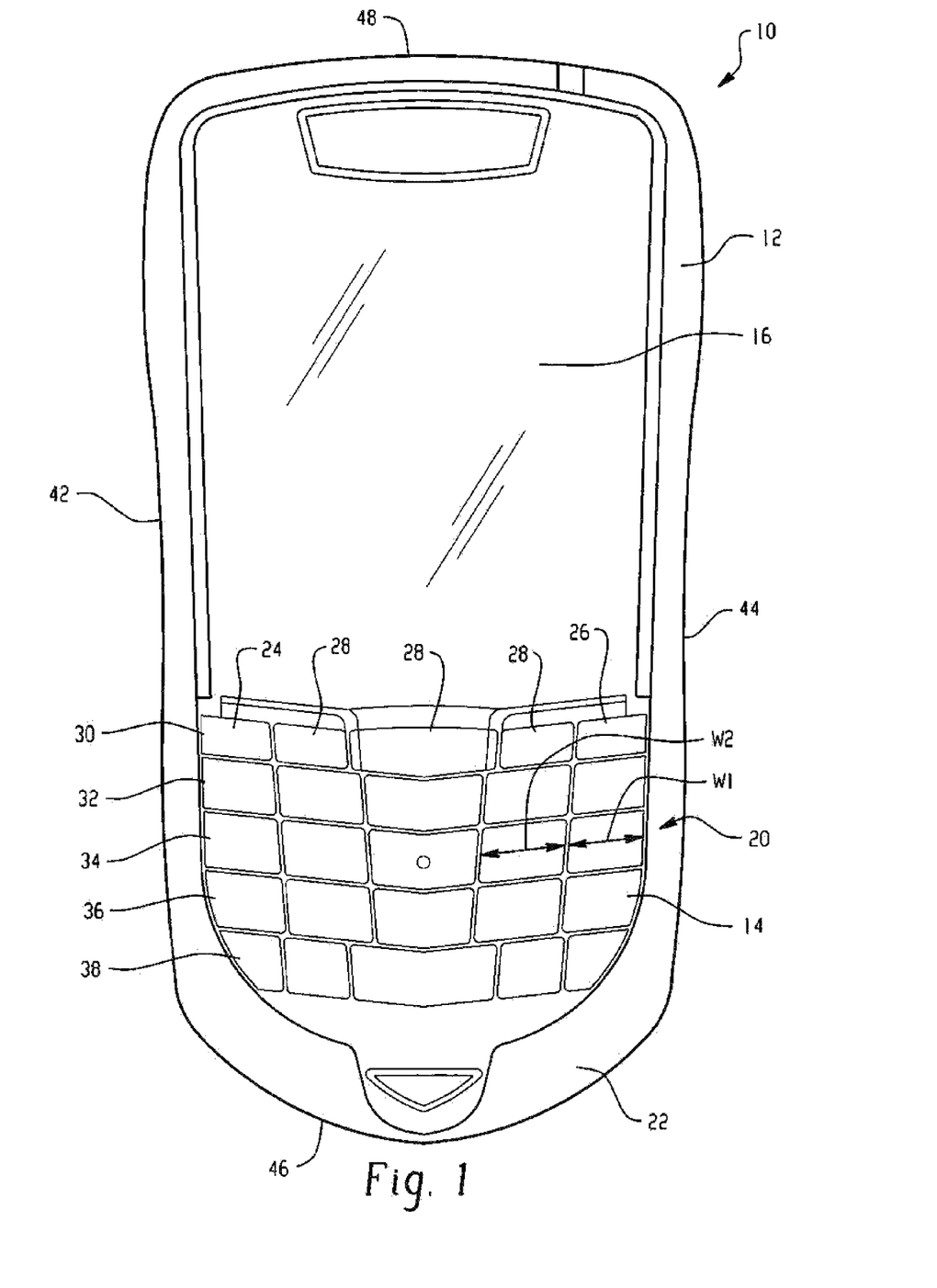
FIG. 1 is a plan view of a mobile communication device incorporating an example key arrangement.
Figure 2:
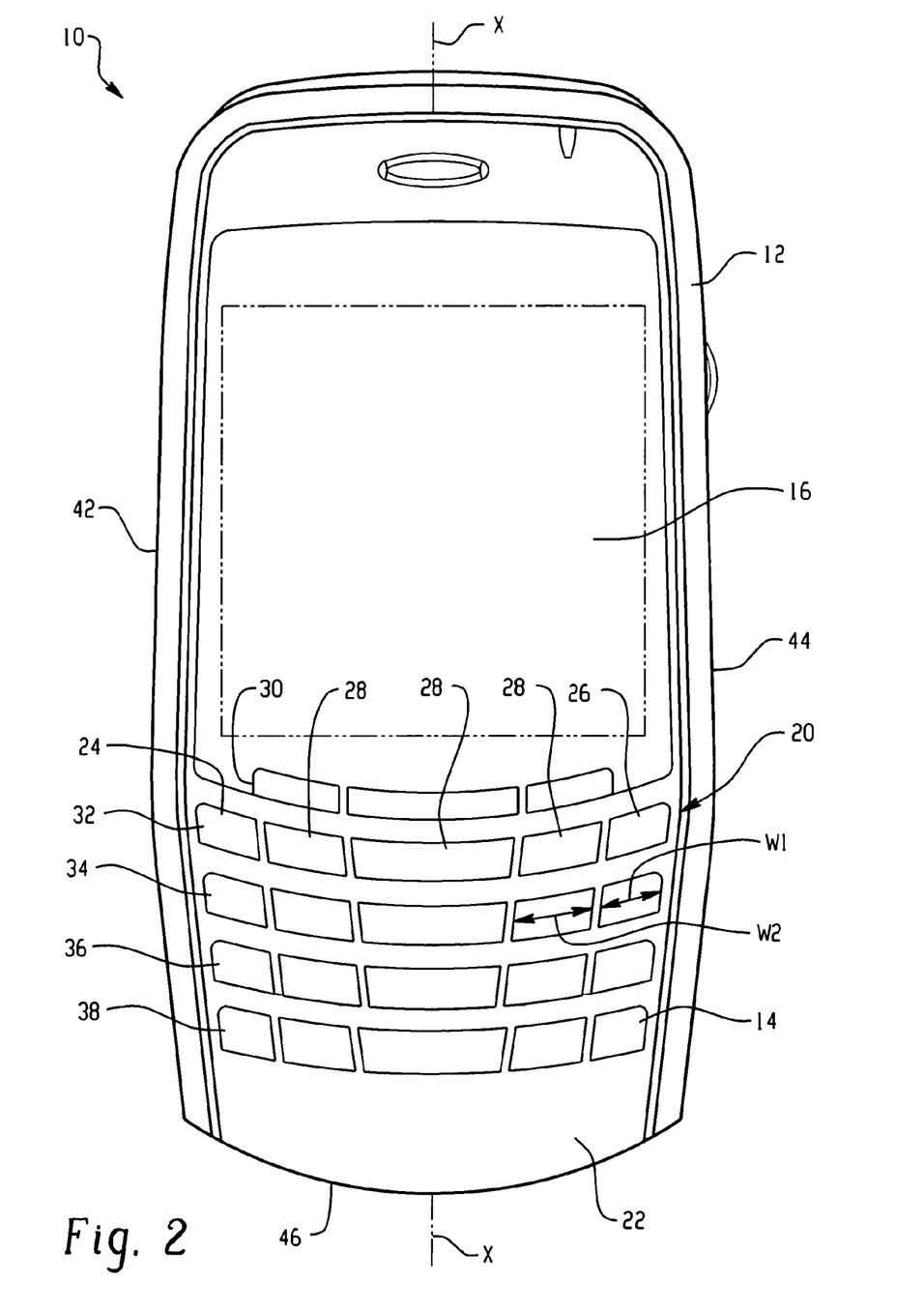
FIG. 2 is a plan view of an alternative mobile communication device incorporating example key arrangement.
Figure 3:
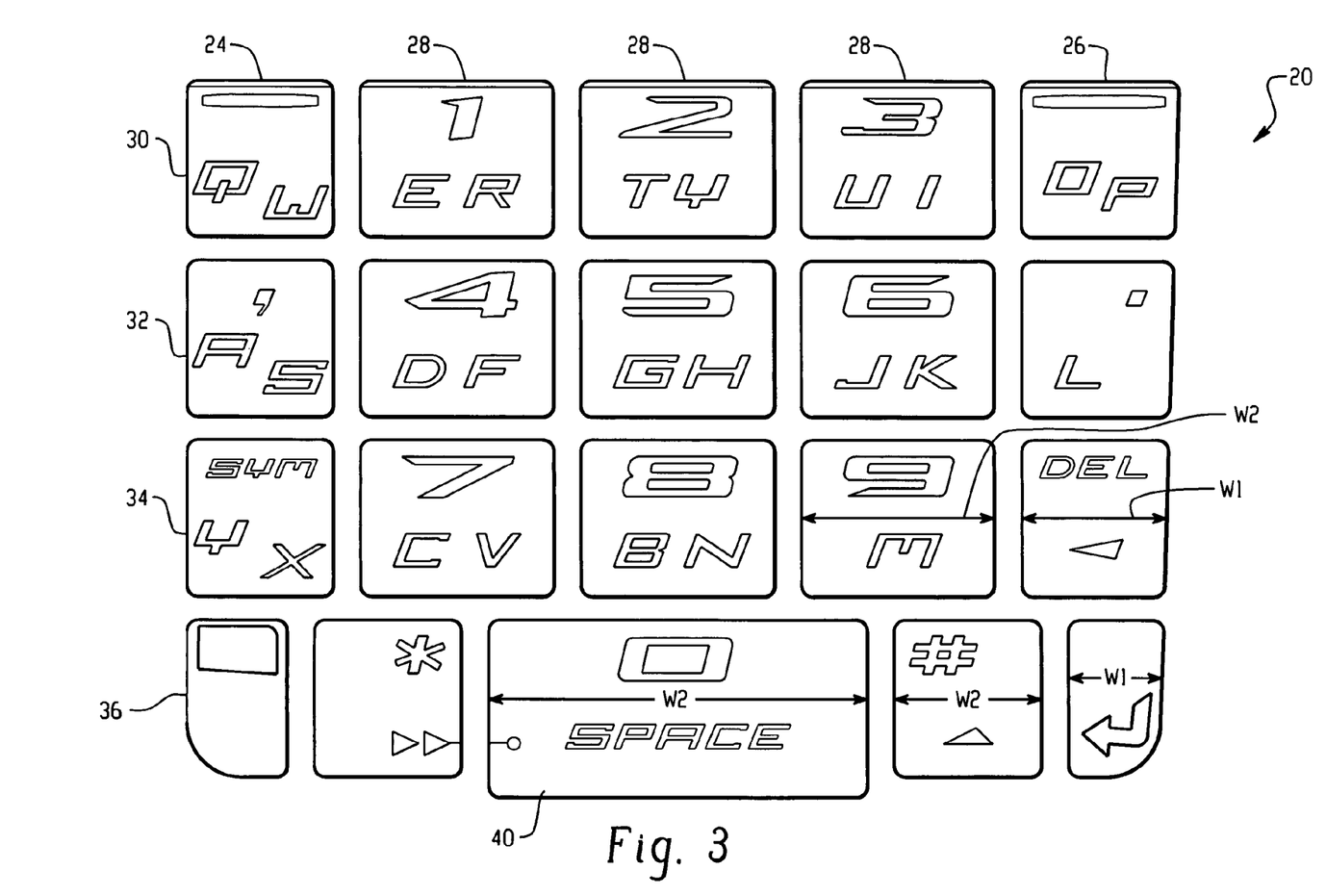
FIG. 3 is a plan view of an example key arrangement.
Figure 4:
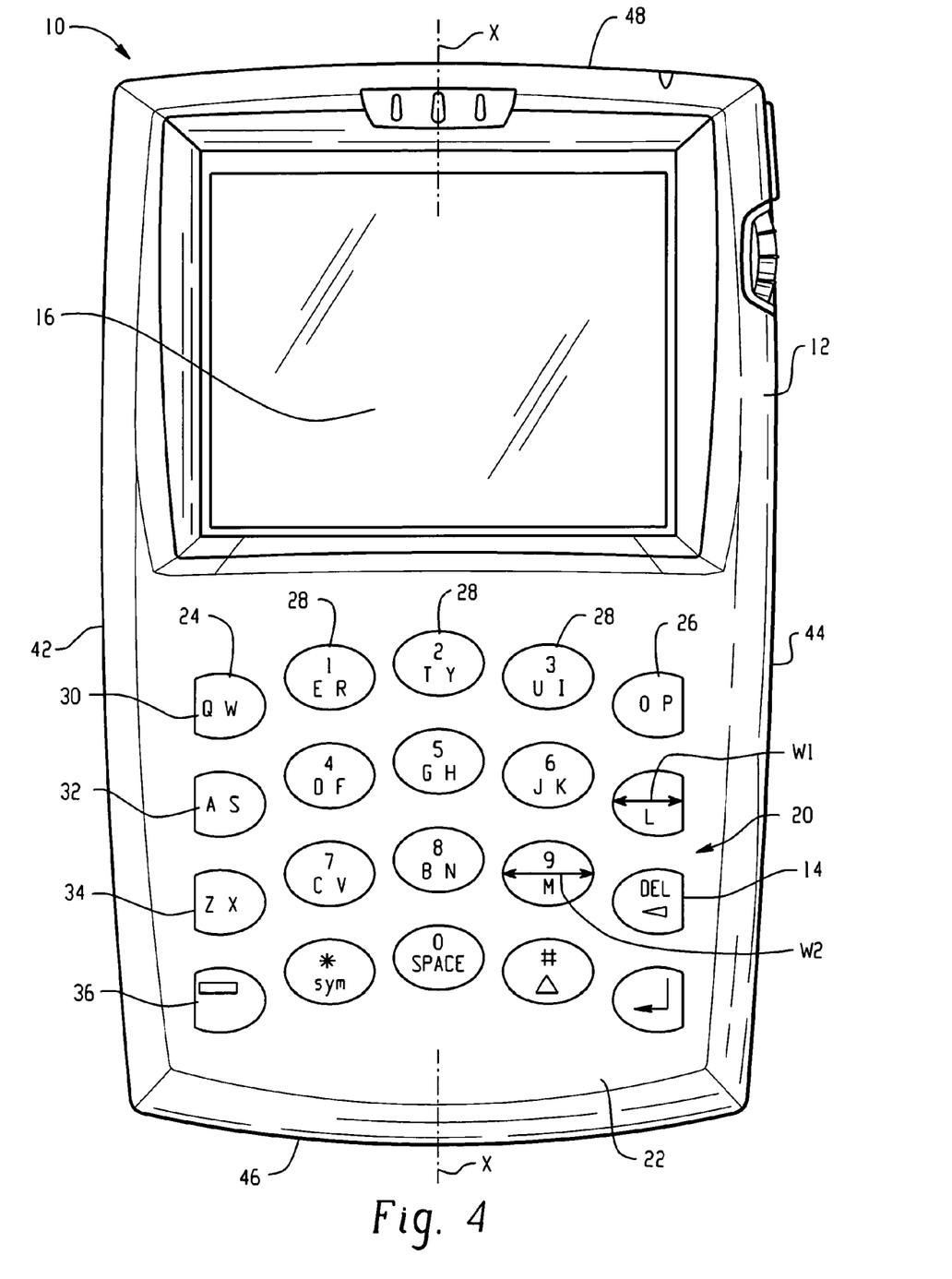
FIG. 4 is a plan view of a mobile communication device incorporating an example key arrangement.

With reference now to the drawings, FIGS. 1-9 depict numerous key arrangements for or a keyboard. FIGS. 1, 2, and 4 depict an example key arrangement on a mobile communication device 10 while FIGS. 3 and 5-9 depict example key arrangements. Any of the key arrangements may be utilized on any kind of input device, the example key arrangement not being limited to a particular application. Examples of mobile communication devices 10 that may derive a benefit from the example key arrangement include mobile stations, cellular telephones, wireless personal digital assistants (PDAs), two-way paging devices, and others. In addition, the example key arrangement may be utilized on conventional telephones, calculators, and other devices having keyboards or keypads.

The example key arrangement utilizes a plurality of keys that are arranged in a grid pattern. In each of the embodiments shown, the grid pattern is regular, in that it utilizes a plurality of rows and columns. The example key arrangement 20 is also applicable to an irregular key arrangement, where keys are not necessarily arranged in a regular pattern, or where additional keys may be arranged around a regular grid pattern.

The example key arrangement 20 utilizes smaller keys around at least a part of the periphery of the keyboard 14. In the embodiments shown, the smaller keys are positioned near the sides of the device 10 such that a user, in the process of depressing keys, may at least partially depress the key while also touching the housing 12 of the device 10.

The smaller peripheral keys may be smaller in width, height, both width and height, or in general dimensions. By utilizing smaller keys around the periphery of the keyboard, more room is allocated in the interior or middle portion of the key arrangement 20. When comparing the example key arrangement to a standard uniformly sized key arrangement, the keys in the middle of the arrangement may be made larger as a result of the smaller peripheral keys. Thus, the key arrangement will take up the same amount of space on the face of the device, but the interior keys will be larger and the peripheral keys will be smaller. The larger interior keys are beneficial because a user will be more likely to depress the desired key and errors associated with smaller keys may be avoided.

FIG. 1 shows a mobile communication device 10 having a housing face 22, a display 16 and a keyboard 14. The keyboard has five rows and five columns of keys arranged in a generally regular grid pattern. The five columns include a first column 24, a last column 26, and three middle columns 28. The five rows include a first row 30, a second row 32, a third row 34, a fourth row 36, and a fifth row 38. In this embodiment, smaller peripheral keys are present in the first and last columns 24, 26, first through fourth rows 30, 32, 34, 36. The keys in the outer columns, i.e., the first and last columns 24, 26, have keys that have a width W1 that is less than the width W2 of the keys in middle columns 28 of their respective rows. The keyboard 14 takes up a fixed amount of space on the face 22 of the housing 12. By reducing the size of the peripheral keys in the first through fourth rows 30, 32, 34, 36, the interior keys in those same rows are made wider. Larger interior keys are easier to depress. In addition, the slightly narrower peripheral keys in the first and last columns 24, 26 are also easy to depress because a user's finger may overlap part of the housing 12 during the selection process without any adverse results. The keys in the first and last columns 24, 26, first through fourth rows 30, 32, 34, 36 have the same width, while the keys in the middle columns 28 have a different width.

FIG. 2 depicts a mobile communication device 10 having a housing face 22, a display 16, and a keyboard 14. The keyboard 14 has five rows and five columns, although the top row is truncated and has fewer keys than rows two through five. The five columns include a first column 24, a last column 26, and three middle columns 28. The keys are arranged in a generally regular grid pattern, where the keys in each column and row are aligned with one another. The rows have an arcuate shape, and the columns angle inwardly toward a common center line X-X. In this embodiment, smaller peripheral keys are positioned in the first and last columns 24, 26, rows two through five 32, 34, 36, 38. The smaller peripheral keys have a width that is reduced relative to the other keys in their corresponding row. The height of all the keys is the same. The keys in the first and last columns 24, 26 are positioned near the sides of the housing face 22. As a result, a user may more easily select the outer peripheral keys without accidentally depressing an unwanted interior key. In addition, because the outer keys have a narrower width, the keys in the middle interior columns 28 are wider. As a result, the keys in the middle columns 28 may be more easily depressed by a user.

FIG. 3 depicts a key arrangement 20 for a keyboard 14 that has rectangular keys. The keys are arranged in a generally regular grid pattern of five columns and four rows. The keys in the columns and rows generally align with one another. The five columns include a first column 24, a last column 26, and three middle columns 28. FIG. 3 represents a reduced column QWERTY keyboard arrangement, where more than one alphabetic character is associated with a single key in three of the four rows. In addition, a telephone keypad is associated with the middle three columns 28 of keys, such that the keyboard 14 may be used for both text and numeric entry. In this embodiment, the keys all have the same height, other than the space key 40, which has a height slightly greater than the remainder of the keys. The keys in the first and last columns, 24, 26 however, have a width that is reduced relative to the other keys in their respective rows.

FIG. 4 depicts a mobile communication device 10 having a housing face 22, a display 16, and a keyboard 14. The keyboard 14 has five rows and five columns. The keys are arranged in a regular grid pattern, where the keys in each column and row are aligned with one another. The rows have an arcuate shape, and the columns are aligned with the longitudinal axis X-X of the housing. In this embodiment, the keys are oval and the keys in the first and last columns 24, 26 have been truncated such that they have a shape that is different from the shape of the other keys. As a result of this truncation, the keys in the first and last columns 24, 26 have a width that is reduced relative to the other keys on the keyboard 14. The height of all the keys is the same. The keys in the first and last columns 24, 26 are positioned near the left side 42 and right side 44 of the housing 12. As a result, a user may more easily select the outer keys without accidentally depressing an unwanted key. In addition, because the outer keys have a different shape from the middle column 28 keys, they may be more easily discernable by touch. While this embodiment shows a key that is truncated on its side, keys may alternatively be truncated on their top and/or bottom surfaces, or on their right side.

Figure 5:
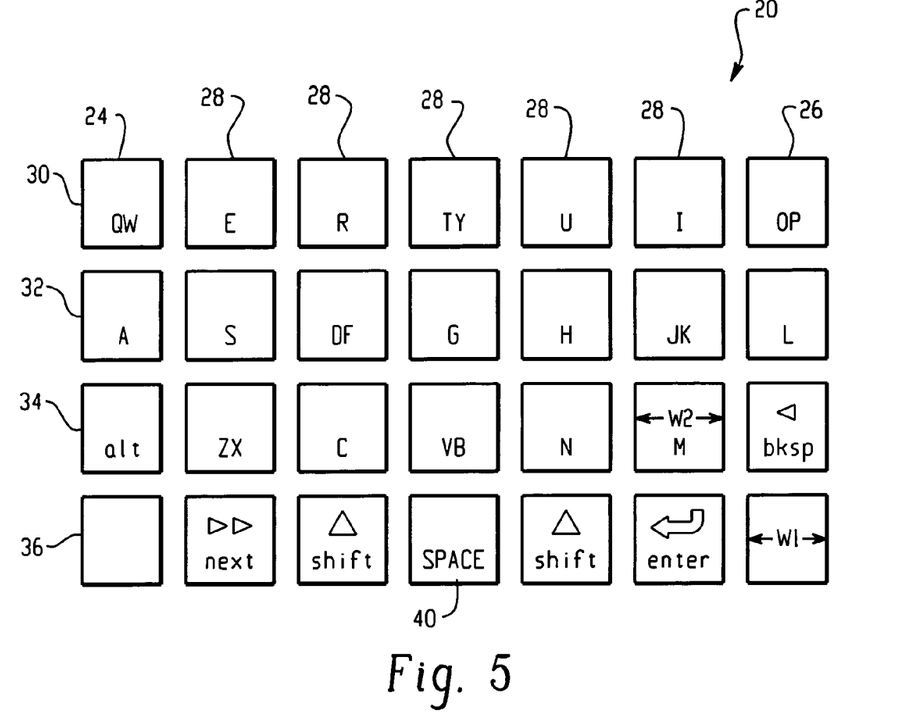
FIG. 5 is a plan view of an alternative example key arrangement.

FIG. 5 is another example key arrangement 20 where the keys are rectangular. The 20 keys are arranged in a regular grid pattern of seven columns and four rows. The keys in the columns and rows align horizontally and vertically with one another. FIG. 5 represents a reduced column QWERTY keyboard arrangement, where more than one alphabetic character is associated with a single key in three of the four rows. In this embodiment, the keys all have the same height. The keys in the first and last columns 24, 26, however, have a width that is reduced relative to the other keys in their respective rows. Because the keys in the outer columns 24, 26 have a reduced width, the keys in the middle columns 28 may be made wider for a fixed size keyboard 14.

Figure 6:
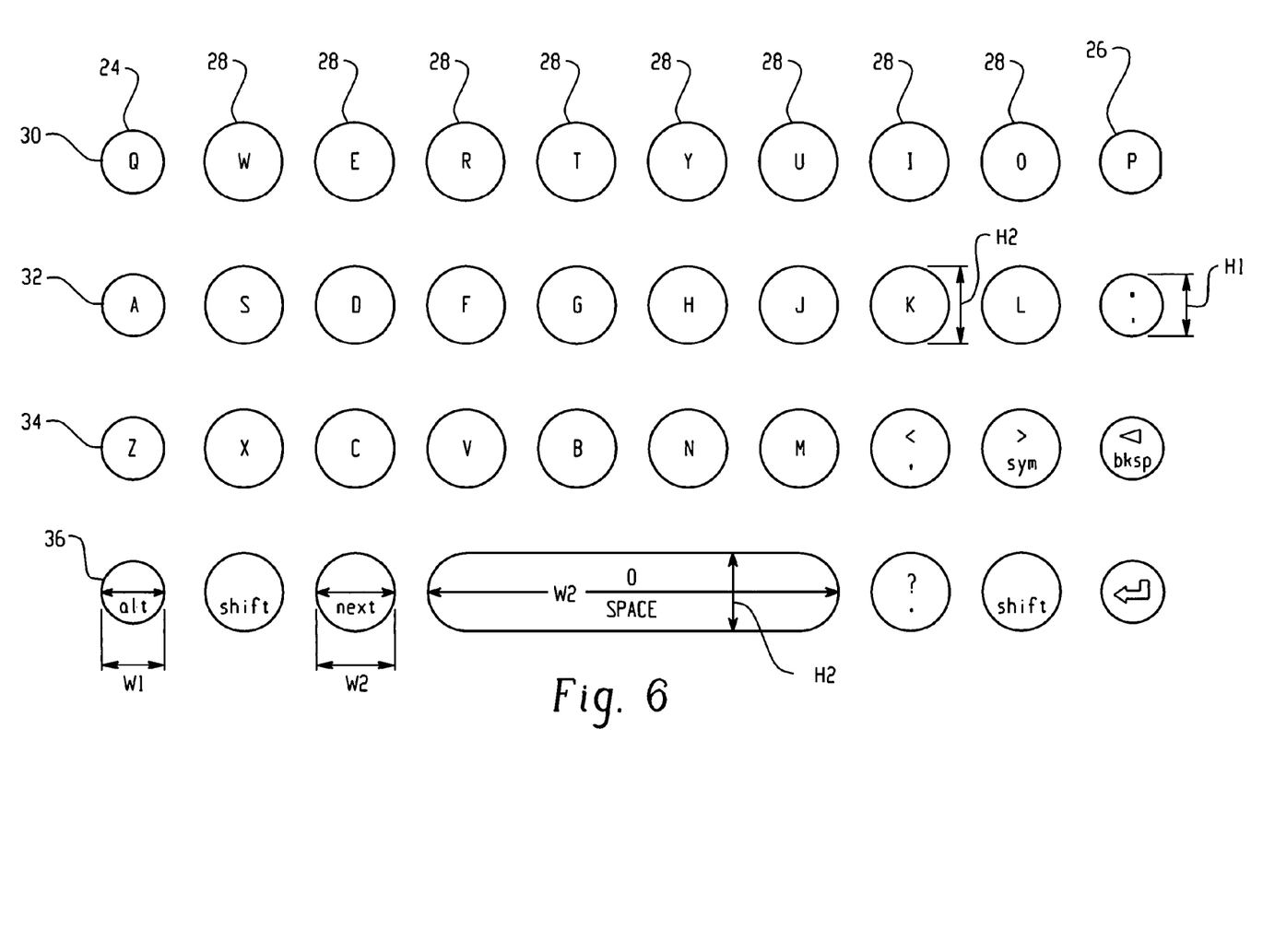
FIG. 6 is a plan view of another alternative example key arrangement.

FIG. 6 is an example key arrangement 20 utilizing keys that are round. The keyboard 14 shown is a full-size alphabetic QWERTY keyboard 14, where the letters of the alphabet take up a total of 26 keys in the arrangement 20. In this embodiment, the keys in the first and last columns 24, 26 have both a reduced width and a reduced height relative to the other keys in the rows. The keys in the outer columns 24, 26 have a width W1 that is less than the width W2 in the middle columns 28. In addition, the keys in the outer columns 24, 26 have a height H1 that is smaller than a height H2 of the keys in the middle columns 28. This key arrangement 20 is designed so that the first and last columns 24, 26 of the key arrangement 20 are positioned on the left and right sides 42, 44 of a device 10, such that the fingers will more easily contact the smaller peripheral keys. Because the keys in the outer columns 24, 26 have a reduced size, the keys in the middle columns 28 may be made wider for a fixed size keyboard 14.

Figure 7:
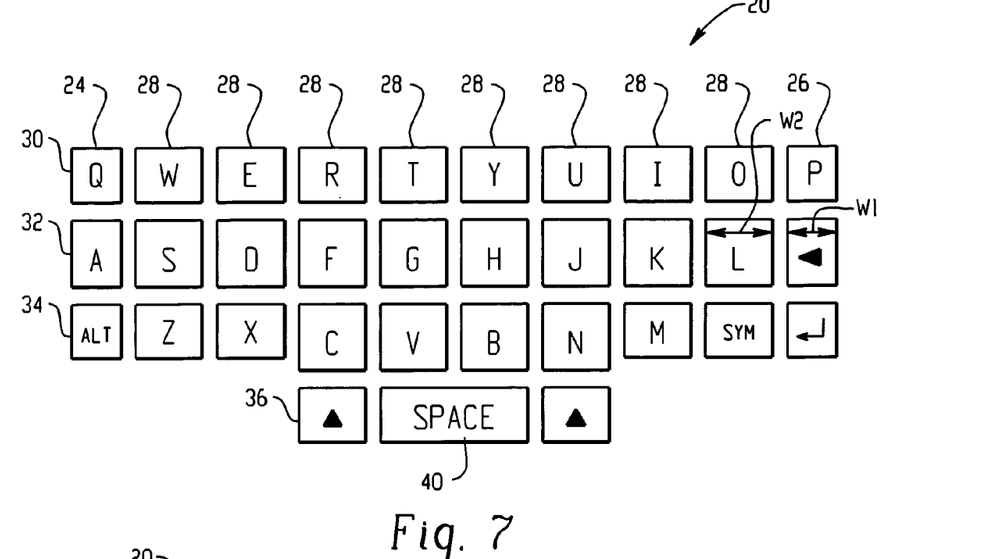
FIG. 7 is a plan view of yet another alternative example key arrangement.

FIG. 7 is another example key arrangement 20 utilizing keys that are rectangular. Like the key arrangement 20 of FIG. 6, the key arrangement 20 shown is a full-size alphabetic QWERTY keyboard, where the letters of the alphabet take up a total of 26 keys in the arrangement. The keys in the first and last columns 24, 26, i.e., left and right sides, of the keyboard 14 have a width W1 that is smaller than the width W2 of the keys in the middle columns 28. This key arrangement 20 is designed so that the first and last columns 24, 26 of the key arrangement 20 are positioned on the sides 42, 44 of a device 10, such that the user's fingers will more easily contact the smaller peripheral keys. Because the peripheral keys are smaller, the keys in the middle columns 28 may be made larger for a fixed size keyboard 14.

Figure 8:
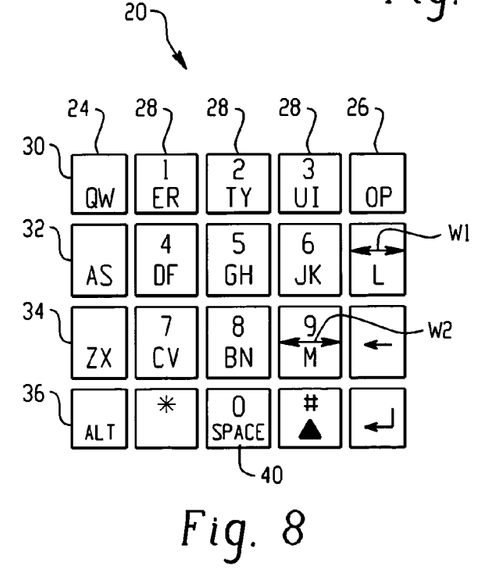
FIG. 8 is a plan view of another alternative example key arrangement.

FIG. 8 is an example key arrangement 20 that also utilizes keys that are rectangular in shape. The keys are arranged in a reduced alphabetic key format, where fewer than 26 keys are utilized for the alphabetic characters. In this embodiment, four rows and five columns are utilized, with the first and last columns 24, 26 having a width that is smaller than the width of the keys in the middle columns 28.

Figure 9:
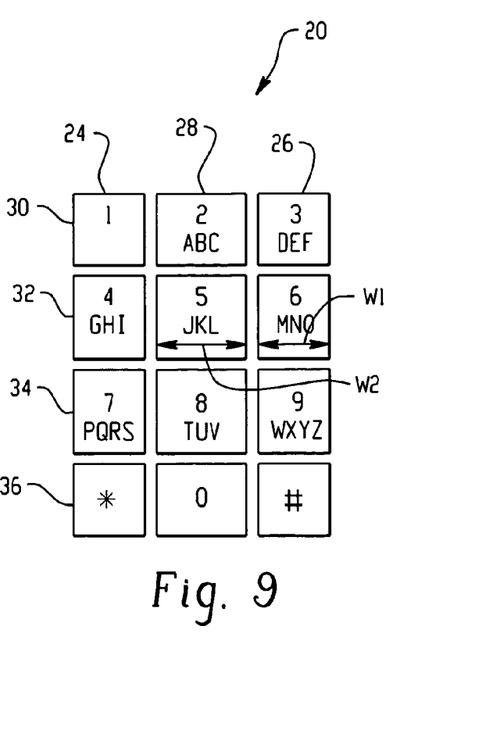
FIG. 9 is a plan view of yet another alternative example key arrangement.

FIG. 9 is an example key arrangement 20 for a standard telephone keypad. The keys have a rectangular shape, with the keys in the first and last columns 24, 26 having a width W1 that is less than the width W2 of the keys in the middle column 28.

The example key arrangement 20 is preferably associated with a physical keyboard 14 that includes a plurality of multi-functional keys. The keys are multi-functional in that they may be used to enter alphabetic characters, numbers, touch tones, symbols, and/or functions, or other known entries. The keyboard 14 is a physical keyboard in the sense that it utilizes keys that are movable to activate switches that are positioned beneath the keys.

The keyboard 14 may be used for text entry and telephony entry. In the embodiments shown, some of the keyboards 14 provide a first user interface that includes alphabetic characters comprising a standard alphabetic format, such as QWERTY, QWERTZ, AZERTY, or DVORAK, among other known formats, for text entry, and a second user interface that includes numeric characters for telephony entry. An example reduced key format keyboard is presented in U.S. patent application Ser. No. 10/785,790, filed on Feb. 24, 2004 and International Application No. PCT/CAO2/01961, filed on Dec. 17, 2002, the disclosures of which are incorporated herein by reference in their entirety.

The example key arrangement 20 is useful with both full size and reduced size keyboards 14. In addition to the letters, numbers, and symbols shown, the keys may further include symbols and functions that are typically utilized with keyboards. Example symbols include ".", ",", ";", "'"", "'", ":", "?", "/", ">", "<", "!", "®", "~", "$", "%", "^", "&", "(", ")", "_", "-", "+", "=", "[", "]", "{", "}", "|", and "\" among other known symbols. Example functions include "tab", "caps lock", "shift", "control", "alt", "return/enter", "backspace", "insert", "delete", "home", "end", "page up", "page down", "end", "escape", "pause", "break", "send", "end", "txt", "sym", and "scroll lock", among other known functions associated with text entry or telephony entry.

A variety of shapes are shown for the keys in the various embodiments. Other shapes may also be utilized, without limitation. In the embodiments shown, the keys in the first and last columns 24, 26 are shown as having a smaller size than the keys in the middle columns 28. In addition, for key arrangements that are positioned at the bottom of a mobile communication device 10, it may be desirable to have the keys in the bottom 46 row have a smaller size than the keys in the upper rows. The keys in the bottom row are preferably positioned near the bottom edge 46 of the face 22 of the housing 12 of the mobile communication device 10 such that the same principals of usage apply and the keys are easier to access because of their proximity to the edge of the device. Alternatively, for a device where the keyboard is positioned at the top 48 of the housing 12, the top row may have keys that are smaller in size than keys in the lower rows of the key arrangement 20.

Figure 10:
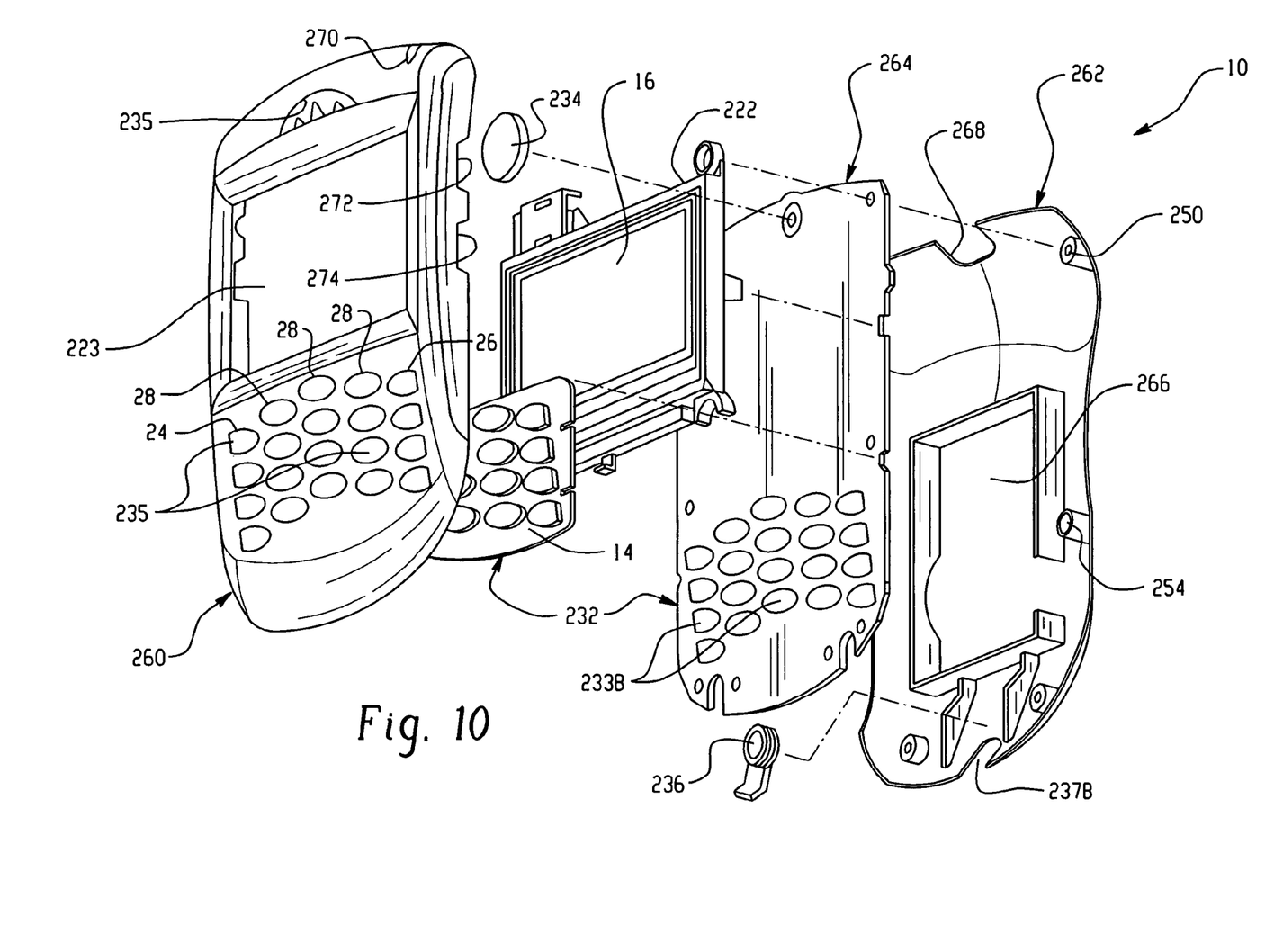
FIG. 10 is an exploded view of a handheld mobile communication device incorporating an example key arrangement.

FIG. 10 is an exploded view of the hardware of a mobile communication device 10 incorporating an example key arrangement 20 on the keyboard 14. The device includes a first device housing section 260 and a second device housing section 262. The housing sections are connected together with fasteners (not shown) that engage a plurality of holes 250, 254 to form a single integrated device housing that encloses the internal components of the mobile communication device 10. The fasteners may be screws, rivets or the like. Fasteners are but one example of possible components that may be used to couple the device housing sections together. Other components include flexible or rigid but deformable members, possibly integral with one of the device housing sections, which engage cooperating structures on the other or each device housing section or are deformed to hold the device housing sections together. The device housing sections might also or instead be coupled together by bonding, with adhesive, for example. However, the device housing sections are preferably coupled together using releasable fasteners such as screws.

The device 10 depicted in FIG. 10 includes a PCB (printed circuit board) 264. Most of the internal components of the mobile communication device 10 are preferably mounted on the PCB 264. The keyboard 14 is preferably formed by positioning a key web 233A over a plurality of switches 233B on the PCB 264. The key web 233A and plurality of switches 233B are preferably configured such that each key in the key web 233A contacts and operates one of the switches 233B when the key is depressed. Other configurations may also be implemented, in which the number of switches 233B may be less than the number of keys on the key web 233A, or the number of switches 233B may be greater than the number of keys on the key web 233A. The key web 233A and switches 233B are also positioned such that the apertures 235 on the first device housing section 260 at least partially expose the keyboard 14. Portions of the key web 233A are exposed by the apertures 235 to provide key surfaces that may be depressed by a user to provide data input to the device 10. Such data input may, for example, be used to generate data communications on the device 10.

A display 16 is preferably mounted on the PCB 264. When the first device housing 25 section 260 and second device housing section 262 are coupled together, an aperture 223 in the first device housing section 260 at least partially exposes the display 16. The aperture 223 in the first device housing section 260 and the display 16 on the PCB 264 may be positioned such that a viewing area 225 of the display 16 is exposed. The frame and other components associated with the display 16 are preferably hidden from view when the first and second device housing sections 260, 262 are coupled together.

A speaker 234 is preferably mounted at or near the top of the PCB 264. One or more apertures 235 in the first device housing section 260 are positioned to at least partially expose the speaker 234 when the first and second device housing sections 260, 262 are coupled together. A microphone 236 is mounted in the second device housing section 262. The microphone 236 is at least partially exposed by the aperture 237B in the second device housing section, and coupled to the PCB and other device components. Audio or voice inputs to the microphone 236 may be used, for example, to generate voice communications. When the microphone 236 is positioned in the housing, an aperture (not shown) is provided in the first device housing section 260 to at least partially expose the microphone 236. The microphone 236 may alternatively be mounted in the first device housing section 260 or on the PCB 264.

The device housing sections 260, 262 may include further apertures to expose or partially expose other device components. In the first device housing section 260, apertures 270, 272 and 274 are configured to partially expose the auxiliary I/O devices. An aperture 268 is similarly positioned in the second device housing section 262 to at least partially expose an auxiliary I/O device 228D. An aperture 266 in the second device housing section 262 may be provided to accommodate a power supply such as a battery. Other apertures may also be provided in the device housing as necessary.

Other internal components of the device 10 may also be mounted on the PCB 264. The device components are interconnected to provide at least data and voice communication functionality, possibly in addition to further local non-communication functions and short-range communication functions. Although these other internal components are not shown in FIG. 10, most of them are preferably mounted on the rear side of the PCB 264, opposite the side on which the keyboard 14, display 16 and speaker 234 are mounted, but some components may be mounted adjacent to the display 16 and/or keyboard 14 or on or along an edge of the PCB 264. The internal components of the device 10 are interconnected as necessary, through wired connections, PCB tracks, other types of connectors or connections, or combinations thereof.

The first and second device housing sections 260, 262, when coupled together, form a 30 handheld mobile communication device housing 10 enclosing the PCB 264 and internal components. The apertures 235, 223, 235 and 237B at least partially expose the speaker 234, display 16, keyboard 14 and microphone 236 as described above. Partial exposure of these components allows a user to make use of these components while at the same time protecting the components from damage. Apertures 268, 270, 272, 274 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 266. Access to the power supply is possible when required, but the battery remains protected when access is not necessary.

The mobile communication device 10 may also include a predictive text computer program that is used in conjunction with the keyboard. Predictive test software is useful in reduced format keyboards, such as the example keyboard, in order to identify the desired input from the combination of keystrokes of a user. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys. An example predictive text computer program is described in the following co-owned patent applications, which are incorporated herein by reference in their entirety: "Customizable Predictive Text Method For Reduced Keyboards," U.S. Provisional Patent Application No. 60/397,680, filed Jul. 23, 2002; "Systems and Methods of Building and Using Custom Word Lists," International Patent Application No. PCT/CAO3/01 103, filed Jul. 23, 2003, and "Portable Electronic Device With Keyboard", International Patent Application No. PCT/CAO2/00862, filed Jun. 10, 2002.

Figure 11:
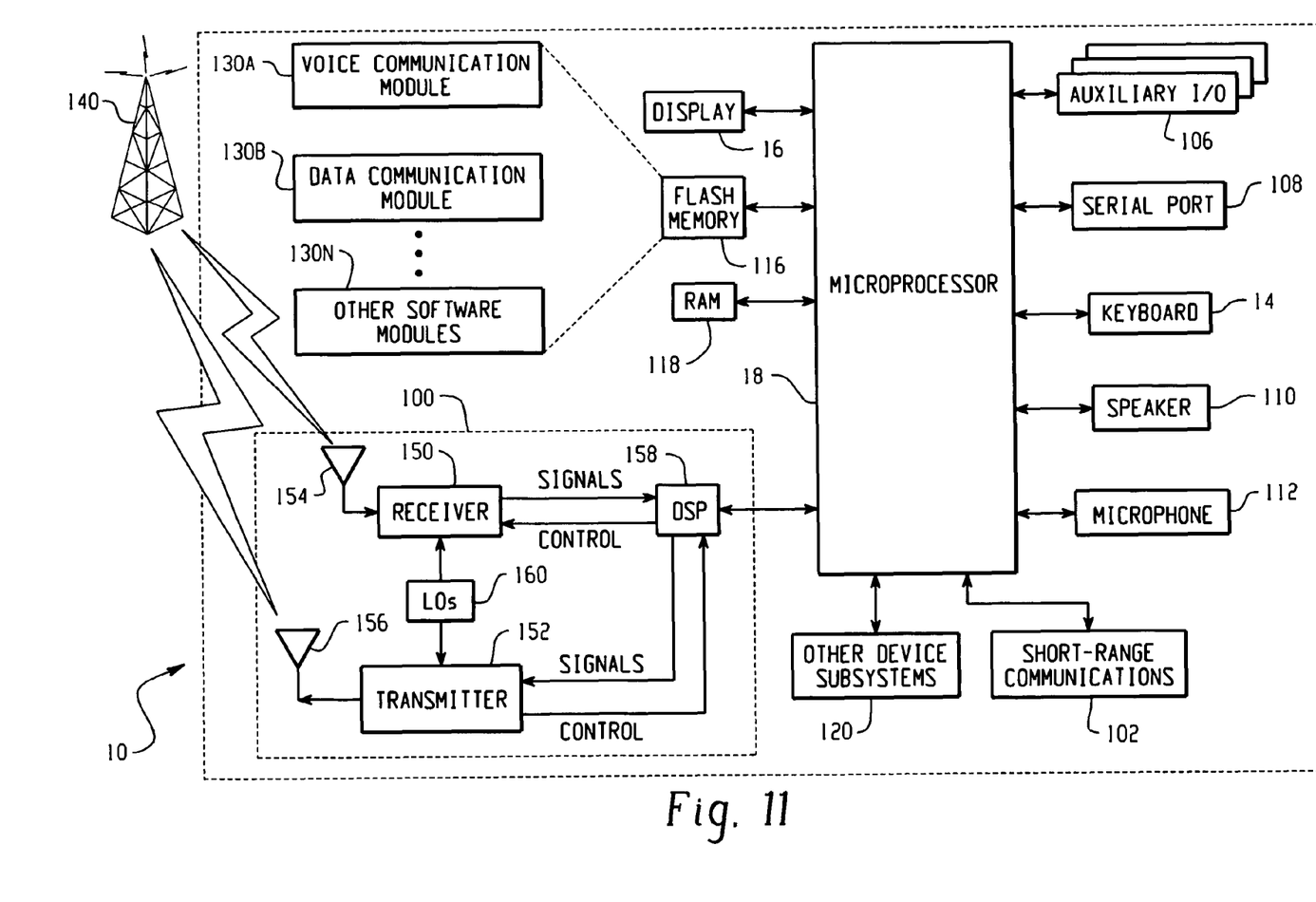
FIG. 11 is a block diagram illustrating an example mobile communication device.

The handheld mobile communication devices 10, presented in FIGS. 1, 2, 4, and 10 include similar features, such as a housing 12, a keyboard 14 and an output device 16. The output device shown is a display 16, which is preferably a full graphic LCD. Other types of output devices may alternatively be utilized. A processing device 18, which is shown schematically in FIG. 11, is contained within the housing 12 and is coupled between the physical keyboard 14 and the display 16. The processing device 18 controls the operation of the display 16, as well as the overall operation of the mobile communication device 10, in response to actuation of keys on the keyboard 14 by the user.

The housing 12 may be elongated vertically, or may take on other sizes and shapes, including a clamshell housing structure, among other structures. The keyboard may include a mode selection key, or other hardware or software for switching between text entry and telephony entry.

In addition to the processing device 18, other parts of the mobile communication device 10 are shown schematically in FIG. 11. These include a communications subsystem 100; a short-range communications subsystem; the keyboard 14 and the display 16, along with other input/output devices 106, 108, 110 and 112; memory devices 116, 118; and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, DataTAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

A method for improving the ergonomics of a key arrangement 10 on a keyboard 14 of a fixed size is also provided. The method includes providing a plurality of keys arranged in a plurality of columns and a plurality of rows. The plurality of columns comprise a first column 24, a last column 26, and one or more middle column 28. The method also includes defining the key size for the keys in the middle columns 28 to have at least one first size and defining the key size for the keys in the first and last columns 24, 26 to have a second size that is smaller than the corresponding first size. The first size may be the width W of the keys, the height H of the keys, or some other dimension of the keys.

In another embodiment, a method for designing a key arrangement 20 for a mobile communication device 10 is provided. The key arrangement 20 includes a plurality of keys arranged in a grid pattern that includes a plurality of columns. The columns include one or more middle column 28. The middle columns 28 are flanked by outer columns. The outer columns are the first and last columns 24, 26. The first step in the method is measuring a width of a face 22 of the mobile communication device 10. The width of the face 22 is preferably the area in which the keyboard 14 is going to be positioned on the device 10. This width is then divided by the total number of columns of keys that form part of the keyboard. The width divided by the total number of columns provides a preliminary key width. The preliminary key width is approximate width that the keys would be in each column if all the keys have the same width.

The next step in the method involves subtracting a predetermined amount from the preliminary key width to determine an outer column key width. The amount corresponds to a decrease in width for keys in the outer columns of the grid pattern of keys. Then the preliminary key width is multiplied by the number of middle columns to determine a preliminary total middle key width. The preliminary total middle key width is added to the amount multiplied by two to determine a final total middle key width. Then, the final total middle key width is divided by the number of middle columns to determine a final key width for the keys in the middle columns.

The method also may include steps to take into account any part of width of the face 22 of the device 10 that is not covered by keys. This amount may be subtracted from the width of the face 22 before the width is divided by the total number of columns.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. An electronic device having a key arrangement comprising:
    a plurality of keys arranged in rows, each row having:
        a first exterior key located at a first end;
        a second exterior key located at a second end; and
        at least two interior keys located between the first and second exterior keys, wherein each of the at least two interior keys has a width greater than the first and second exterior keys in the corresponding row.

2. The electronic device of claim 1, wherein each of the plurality of keys has essentially the same shape.

3. The electronic device of claim 2, wherein at least one row comprises at least one middle key located between the at least two interior keys.

4. The electronic device of claim 3, wherein each of the at least one middle key has a width that is greater than a width of the at least two interior keys.

5. The electronic device of claim 4, wherein the at least one middle key comprises at least two middle keys.

6. The electronic device of claim 5, wherein each of the at least two middle keys has a width greater than the at least two interior keys.

7. The electronic device of claim 1, wherein at least a portion of the first and second exterior keys and a portion of the at least two interior keys have indicia corresponding to alphabetic letters.

8. The electronic device of claim 7, wherein the indicia corresponding to alphabetic letters are arranged in one of a QWERTY, AZERTY, QWERTZ, and Dvorak key arrangements.

9. The electronic device of claim 7, wherein at least a portion of the plurality of keys have indicia corresponding to numbers.

10. The electronic device of claim 9, wherein the indicia corresponding to numbers are arranged according to International Telecommunication Union (ITU) standard E.161.

11. The electronic device of claim 1, wherein the plurality of keys have at least three different shapes.

12. A key arrangement comprising:
    a plurality of keys arranged in rows, each row having:
        a first exterior key located at a first end;
        a second exterior key located at a second end; and
        at least two interior keys located between the first and second exterior keys, wherein each of the at least two interior keys has a width greater than the first and second exterior keys in the corresponding row.

13. The key arrangement of claim 12, wherein each of the plurality of keys has essentially the same shape.

14. The key arrangement of claim 13, wherein at least one row comprises at least one middle key located between the at least two interior keys.

15. The key arrangement of claim 14, wherein each of the at least one middle key has a width that is greater than a width of the at least two interior keys.

16. The key arrangement of claim 15, wherein the at least one middle key comprises at least two middle keys.

17. The key arrangement of claim 16, wherein each of the at least two middle keys has a width greater than the at least two interior keys.

18. The key arrangement of claim 12, wherein at least a portion the first and second exterior keys and a portion of at least two interior keys have indicia corresponding to alphabetic letters.

19. The key arrangement of claim 18, wherein the indicia corresponding to alphabetic letters are arranged in one of a QWERTY, AZERTY, QWERTZ, and Dvorak key arrangements.

20. The key arrangement of claim 18, wherein at least a portion of the plurality of keys have indicia corresponding to numbers.

21. The key arrangement of claim 20, wherein the indicia corresponding to numbers are arranged according to International Telecommunication Union (ITU) standard E.161.

22. The key arrangement of claim 12, wherein the plurality of keys has at least three different shapes.

* * * * *